United States Patent
Tu et al.

(10) Patent No.: US 11,461,659 B2
(45) Date of Patent: Oct. 4, 2022

(54) FEATURE SET DETERMINING METHOD AND APPARATUS

(71) Applicant: Huawei Technologies Co., Ltd., Shenzhen (CN)

(72) Inventors: Dandan Tu, Shenzhen (CN); Jiajin Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1300 days.

(21) Appl. No.: 15/871,460

(22) Filed: Jan. 15, 2018

(65) Prior Publication Data
US 2018/0150746 A1     May 31, 2018

Related U.S. Application Data

(63) Continuation of application No. PCT/CN2016/090293, filed on Jul. 18, 2016.

(30) Foreign Application Priority Data

Feb. 5, 2016   (CN) .......................... 201610082067.3

(51) Int. Cl.
| | | |
|---|---|---|
| G06N 3/08 | (2006.01) | |
| G06K 9/62 | (2022.01) | |
| G06N 3/04 | (2006.01) | |
| G06V 10/44 | (2022.01) | |
| G06V 40/16 | (2022.01) | |
| G06F 17/16 | (2006.01) | |

(52) U.S. Cl.
CPC .............. *G06N 3/088* (2013.01); *G06F 17/16* (2013.01); *G06K 9/6234* (2013.01);
(Continued)

(58) Field of Classification Search
CPC ...... G06N 3/088; G06N 3/0454; G06F 17/16; G06F 16/2465; G06F 16/254;
(Continued)

(56) References Cited

U.S. PATENT DOCUMENTS

| | | | |
|---|---|---|---|
| 2009/0092299 A1 | 4/2009 | Jerebko et al. | |
| 2011/0135203 A1 | 6/2011 | Iwamoto et al. | |
| 2013/0262349 A1* | 10/2013 | Bouqata | G06N 20/10 |
| | | | 706/12 |

FOREIGN PATENT DOCUMENTS

| | | |
|---|---|---|
| CN | 103902570 A | 7/2014 |
| CN | 103942526 A | 7/2014 |

(Continued)

OTHER PUBLICATIONS

Machine Translation and Abstract of Chinese Publication No. CN103902570, Jul. 2, 2014, 34 pages.
(Continued)

*Primary Examiner* — Vu A Vu
(74) *Attorney, Agent, or Firm* — Conley Rose, P.C.

(57) ABSTRACT

A feature set determining method includes obtaining, according to a received feature set determining request, data used for feature learning. The feature set determining request includes a learning objective of the feature learning. The method includes performing type analysis on the data to divide the data into first-type data and second-type data. The method includes performing semi-supervised learning on the first-type data to extract multiple first-type features. The method includes performing adaptive learning on the second-type data to extract multiple second-type features. The method includes evaluating the first-type features and the second-type features to obtain an optimal feature set.

20 Claims, 7 Drawing Sheets

(52) U.S. Cl.
CPC ......... *G06K 9/6271* (2013.01); *G06N 3/0454* (2013.01); *G06V 10/454* (2022.01); *G06V 40/16* (2022.01)

(58) Field of Classification Search
CPC .. G06K 9/6234; G06K 9/6271; G06V 10/454; G06V 40/16; G06V 10/82
USPC .......................................................... 706/25
See application file for complete search history.

(56) References Cited

FOREIGN PATENT DOCUMENTS

| | | |
|---|---|---|
| CN | 102301395 B | 8/2014 |
| CN | 104283737 A | 1/2015 |
| CN | 104573741 A | 4/2015 |

OTHER PUBLICATIONS

Machine Translation and Abstract of Chinese Publication No. CN103942526, Jul. 23, 2014, 17 pages.
Machine Translation and Abstract of Chinese Publication No. CN104283737, Jan. 14, 2015, 24 pages.
Machine Translation and Abstract of Chinese Publication No. CN104573741, Apr. 29, 2015, 36 pages.
Foreign Communication From a Counterpart Application, PCT Application No. PCT/CN2016/090293, English Translation of International Search Report dated Nov. 8, 2016, 2 pages.

\* cited by examiner

FEATURE SET DETERMINING METHOD AND APPARATUS

CROSS-REFERENCE TO RELATED APPLICATIONS

This application is a continuation of International Application No. PCT/CN2016/090293, filed on Jul. 18, 2016, which claims priority to Chinese Patent Application No. 201610082067.3, filed on Feb. 5, 2016. The disclosures of the aforementioned applications are hereby incorporated by reference in their entireties.

TECHNICAL FIELD

The present disclosure relates to the field of computer technologies, and specifically, to a feature set determining method and apparatus.

BACKGROUND

High-dimension data is common in many application issues of computer vision, pattern recognition, and data mining. The high-dimension data usually refers to many types of data, such as data of various types of commodities, and each type of commodity may be considered as one dimension. The high-dimension data may cause many problems such as degradation of algorithm running performance and accuracy. An objective of feature learning is to find a useful feature set from raw data, and then implement tasks such as data clustering, data classification, and data retrieval by using some effective algorithms.

In a whole data mining process, more than half of time is spent on a feature learning phase. An objective of feature learning is to eliminate uncorrelated and redundant features by using technologies such as unsupervised learning, feature extraction, and feature selection, to reduce system complexity. When a machine learning algorithm becomes confusing due to a pseudo-structure caused by an uncorrelated feature, a serious overfitting problem may occur. In the machine learning field, to reduce computing costs and storage costs and improve prediction accuracy, feature learning technologies become increasingly important.

SUMMARY

To resolve a prior-art problem of spending much time on feature learning, embodiments of the present disclosure provide a feature set determining method, in which different processing methods are used for different types of data, so that not only feature learning efficiency is improved, but also an optimal feature set including features with higher accuracy rates can be obtained, thereby improving an accuracy rate of a determined feature set. The embodiments of the present disclosure further provide a corresponding apparatus.

To achieve the foregoing objective, the following technical solutions are used in the embodiments of the present disclosure.

A first aspect of the present disclosure provides a feature set determining method, and the feature set determining method is often applied to a distributed computing platform. The distributed computing platform may include multiple computing nodes, and each computing node may trigger a feature set determining process according to an instruction of a control node or a preconfigured task. The feature set determining method may include obtaining, according to a received feature set determining request, data used for feature learning, where the feature set determining request includes a learning objective of the feature learning, performing type analysis on the obtained data, to divide the data into first-type data and second-type data, where the first-type data is non-numeric-type data, and the second-type data is numeric-type data, performing semi-supervised learning on the first-type data, to extract multiple first-type features, and performing adaptive learning on the second-type data, to extract multiple second-type features, evaluating the multiple first-type features and the multiple second-type features, to obtain an optimal feature set, where the optimal feature set includes multiple features with accuracy rates meeting a preset condition, and the accuracy rate is a degree of closeness between each feature and the learning objective, and outputting the optimal feature set, to respond to the feature set determining request. The feature learning is searching for a center of each type by using a method such as a nearest neighbor center-to-center distance, to implement data clustering, and then analyzing each type of clustered data, to extract a feature in the data. For example, if feature learning is performed on a human face, because data of a same type has a same tendency, face data used to depict a same facial organ may be clustered into one type, and then, data of each type is analyzed and feature data of each facial organ is extracted, so as to determine that learned data is corresponding to a human face. It can be learned from description of the foregoing first aspect that, different processing methods are used for different types of data, so that not only feature learning efficiency is improved, but also an accuracy rate of a feature set can be improved.

With reference to the first aspect, in a first possible implementation manner, the first-type data includes labeled data and unlabeled data, and the step of performing semi-supervised learning on the first-type data, to extract multiple first-type features in the foregoing first aspect includes performing unsupervised learning on the unlabeled data by using a sparse autoencoder algorithm, to obtain function parameters W and b in the sparse autoencoder algorithm, where the parameter W is a variable coefficient in the sparse autoencoder algorithm, and the parameter b is a constant in the sparse autoencoder algorithm; and performing feature transformation on the labeled data and W and b by using a feed-forward autoencoder algorithm, to obtain the multiple first-type features. W and b are variables, but specific values of W and b are obtained according to the unlabeled data by means of unsupervised learning on the unlabeled data. There are a large quantity of W and b, and the large quantity of W and b are usually represented by using a matrix. It can be learned from the first possible implementation manner of the foregoing first aspect that, the unlabeled data and the unlabeled data each have corresponding processing methods, and there is no need to label each piece of data, so that a lot of labor is saved. In addition, a small amount of labeled data may be used to test a feature obtained from the unlabeled data, thereby ensuring an accuracy rate.

With reference to the first aspect, in a second possible implementation manner, the step of performing adaptive learning on the second-type data, to extract multiple second-type features in the foregoing first aspect includes performing linear correlation judgment on the second-type data, performing feature extraction according to a result of the linear correlation judgment by using a feature extraction strategy corresponding to the result, to obtain a feature transformation matrix, and performing feature transformation on labeled data in the second-type data according to the feature transformation matrix, to obtain the multiple second-type features. It can be learned from the second possible implementation manner of the foregoing first aspect that, for different judgment results, feature extraction is performed by using different feature extraction strategies, so that computing efficiency can be improved.

With reference to the second possible implementation manner of the first aspect, in a third possible implementation manner, the step of performing feature transformation on labeled data in the second-type data according to the feature transformation matrix, to obtain the second-type features in the foregoing second possible implementation manner includes performing feature transformation on the labeled data in the second-type data according to the feature transformation matrix, to obtain features obtained from the adaptive learning; and using, when accuracy rates of the features obtained from the adaptive learning meet the preset condition, the features obtained from the adaptive learning as the second-type features, or performing, when accuracy rates of the features obtained from the adaptive learning do not meet the preset condition, automatic feature selection on the features obtained from the adaptive learning, to determine the second-type features. It can be learned from the third possible implementation manner of the foregoing first aspect that, accuracy rates of the second-type features all meet the requirement, so that an accuracy rate of a feature is improved.

With reference to the second or the third possible implementation manner of the first aspect, in a fourth possible implementation manner, the step of performing feature extraction according to a result of the linear correlation judgment by using a feature extraction strategy corresponding to the result, to obtain a feature transformation matrix in the foregoing second or third possible implementation manner includes when the result is linear correlation, if a proportion of a data volume of a labeled-data set in the second-type data exceeds a preset threshold, performing supervised linear feature extraction by using a linear discriminant analysis (LDA) algorithm, to obtain the feature transformation matrix, or if a proportion is lower than a preset threshold, performing non-supervised linear feature extraction by using a principal component analysis (PCA) algorithm, to obtain the feature transformation matrix; or when the result is non-linear correlation, if a proportion exceeds a preset threshold, performing supervised linear feature extraction by using a kernel linear discriminant analysis (KLDA) algorithm, to obtain the feature transformation matrix, or if a proportion is lower than a preset threshold, performing non-supervised non-linear feature extraction by using an MIGFE algorithm, to obtain the feature transformation matrix. It can be learned from the fourth possible implementation manner of the foregoing first aspect that, for different judgment results, feature extraction is performed by using different algorithms so that computing efficiency is improved.

With reference to the third possible implementation manner of the first aspect, in a fifth possible implementation manner, the step of performing, when accuracy rates of the features obtained from the adaptive learning do not meet the preset condition, automatic feature selection on the features obtained from the adaptive learning, to determine the second-type features in the third possible implementation manner includes removing constants from the features obtained from the adaptive learning, to obtain multiple primary features, and sorting and screening the primary features according to information gains of the primary features and a degree of similarity between the primary features, and using the sorted primary features as the second-type features. It can be learned from the fifth possible implementation manner of the foregoing first aspect that, a redundant feature can be reduced through constant removal, feature sorting, and feature screening, so as to ensure that all obtained second-type features are useful features, thereby improving computing efficiency.

A second aspect of the present disclosure provides a feature set determining apparatus. The feature set determining apparatus is configured to implement functions of the method provided in the foregoing first aspect or any optional implementation manner of the first aspect, and is implemented by using hardware/software. The hardware/software includes units corresponding to the foregoing functions.

A third aspect of the present disclosure provides a computer storage medium. The computer storage medium stores a feature set determining program in the foregoing first aspect or any optional implementation manner of the first aspect.

A fourth aspect of the present disclosure provides a physical host. The physical host includes a hardware layer, a host running on the hardware layer, and one or more virtual machines running on the host. The virtual machine is configured to implement functions of the method provided in the foregoing first aspect or any optional implementation manner of the first aspect, and is implemented by using hardware/software. The hardware/software includes units corresponding to the foregoing functions.

In comparison with the prior art in which much time is spent on feature learning, in the feature set determining method provided in the embodiments of the present disclosure, different processing methods are used for different types of data during feature learning, so that not only feature learning efficiency is improved, but also an optimal feature set including features with higher accuracy rates can be obtained, thereby improving an accuracy rate of a feature set.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

Embodiments of the present disclosure provide a feature set determining method, in which different processing methods are used for different types of data, so that not only feature learning efficiency is improved, but also an accuracy rate of a feature set can be improved. The embodiments of the present disclosure further provide a corresponding apparatus. Details are separately described below.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

For ease of understanding the embodiments of the present disclosure, the following briefly describes technical terms that may be used in the embodiments of the present disclosure.

A nearest neighbor center-to-center distance is determining a center according to multiple pieces of data in relatively centralized distribution, and then if a distance between another piece of data and the center meets a neighbor condition, the another piece of data may be considered as belonging to a same type.

Feature learning is searching for a center of each type by using a method such as a nearest neighbor center-to-center distance, to implement data clustering, and then analyzing each type of clustered data, to extract a feature in the data. For example, if feature learning is performed on a human face, because data of a same type has a same tendency, face data used to depict a same facial organ may be clustered into one type, and then, data of each type is analyzed and feature data of each facial organ is extracted, so as to determine that learned data is corresponding to a human face.

A feature set is a set including multiple features.

An optimal feature set is a set of features with accuracy rates meeting a preset condition.

An accuracy rate is a degree of closeness between each feature in a feature set and a learning objective.

Labeled data is data with a label.

Unlabeled data is data without a label.

A labeled-data set is a set of labeled data.

An unlabeled-data set is a set of unlabeled data.

A sparse autoencoder algorithm is a deep learning algorithm, and is often referred to as a sparse autoencoder.

Function parameters W and b in the sparse autoencoder algorithm: W and b are variables, but specific values of W and b may be obtained according to unlabeled data by means of unsupervised learning on the unlabeled data. There are a large quantity of W and b, and the large quantity of W and b are usually represented by using a matrix. For example, the large quantity of W and b may be represented as the following matrix:

$$\begin{vmatrix} W11 & W2 & b11 & b21 \\ W12 & W22 & b12 & b22 \\ W13 & W23 & b13 & b23 \\ W14 & W24 & b14 & b24 \end{vmatrix}$$

Certainly, the foregoing matrix is only described as an example. Actually, W and b may have more values, and are not limited to the several values in the matrix.

A feed-forward autoencoder algorithm is also a deep learning algorithm, and is often referred to as a feed-forward autoencoder.

Unsupervised learning is a training method with a training sample but without a training label.

Supervised learning is a training method with a training sample and a training label.

Semi-supervised learning is a training method with a training sample, but only a part of data has a training label.

An LDA algorithm, a PCA algorithm, a KLDA algorithm, and an MIGFE algorithm are existing algorithms in the prior art, and details are not described herein.

When the foregoing related nouns are mentioned below in this application, reference may be made to the foregoing interpretations for understanding.

With rapid development of the Internet, a data volume on a network is growing, and a service operator or another vendor may determine some service strategies by analyzing data on the network. Therefore, currently, data analysis becomes particularly important. Generally, the data analysis is performing feature learning on data to obtain a feature set of the data. Then a data mining model, a machine intelligent model, an artificial intelligence model, or the like is established according to the feature set of the data, and a corresponding service strategy is established by using a corresponding model.

It can be learned from the foregoing description that, no matter which model is to be established, the feature learning is an essential step. Therefore, the embodiments of the present disclosure focus on describing a process of the feature learning.

Figure 1:
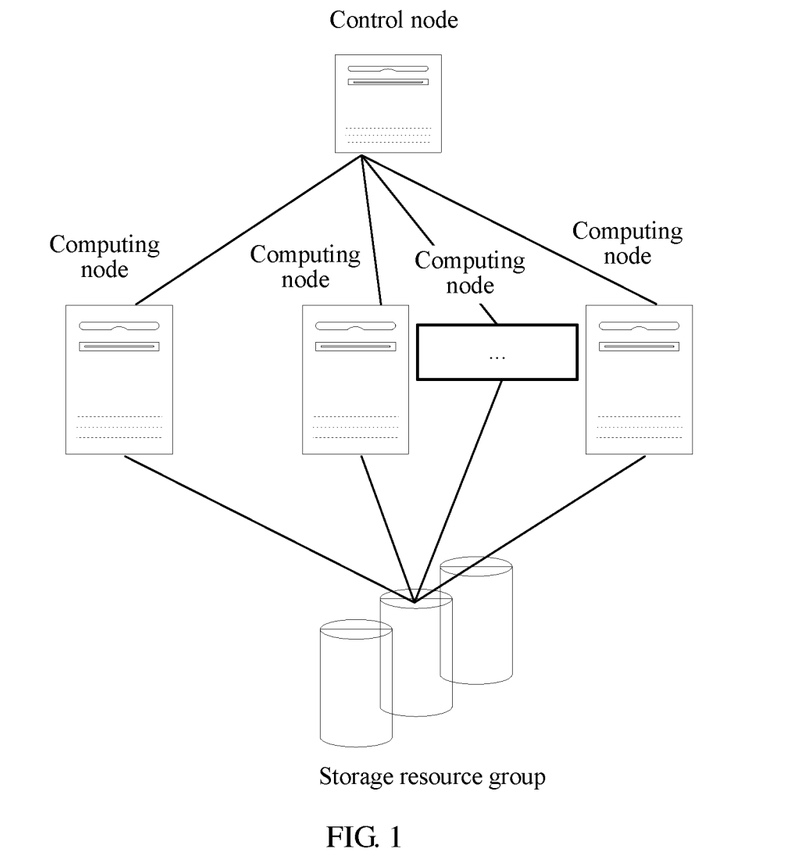
FIG. 1 is a schematic diagram of an embodiment of a network environment of determining a feature set according to an embodiment of the present disclosure.

First, referring to FIG. 1, a network environment of feature learning in an embodiment of the present disclosure is described.

A network shown in FIG. 1 includes a storage resource group, a control node, and multiple computing nodes. Massive data on the network is usually stored in the storage resource group. The storage resource group provides network storage resources for a computing device or user equipment on the network, and the storage resource group may be understood as a storage resource pool. In this embodiment of the present disclosure, data in the storage resource group is segmented for all the computing nodes on the network, instead of an individual computing node. The control node may control each computing node to perform feature learning. For example, the control node may send a feature set determining request to a computing node, and then the computing node may obtain data from the storage resource pool according to the feature set determining request, perform feature learning on the data, and output an optimal feature set in response to the feature set determining request. Certainly, a process of the feature learning by the computing node may not be controlled by the control node. A task may be set on the computing node, and when a particular amount of data is generated in the storage resource group, a feature learning task is automatically started, and an optimal feature set is output.

All the computing nodes shown in FIG. 1 seem as independent devices. Actually, the computing node may be a virtual machine on a physical machine.

A distributed system is a common system on the network. The process of the feature learning in this embodiment of the present disclosure is combined with the distributed system, and reference may be made to FIG. 2 for understanding.

Figure 2:
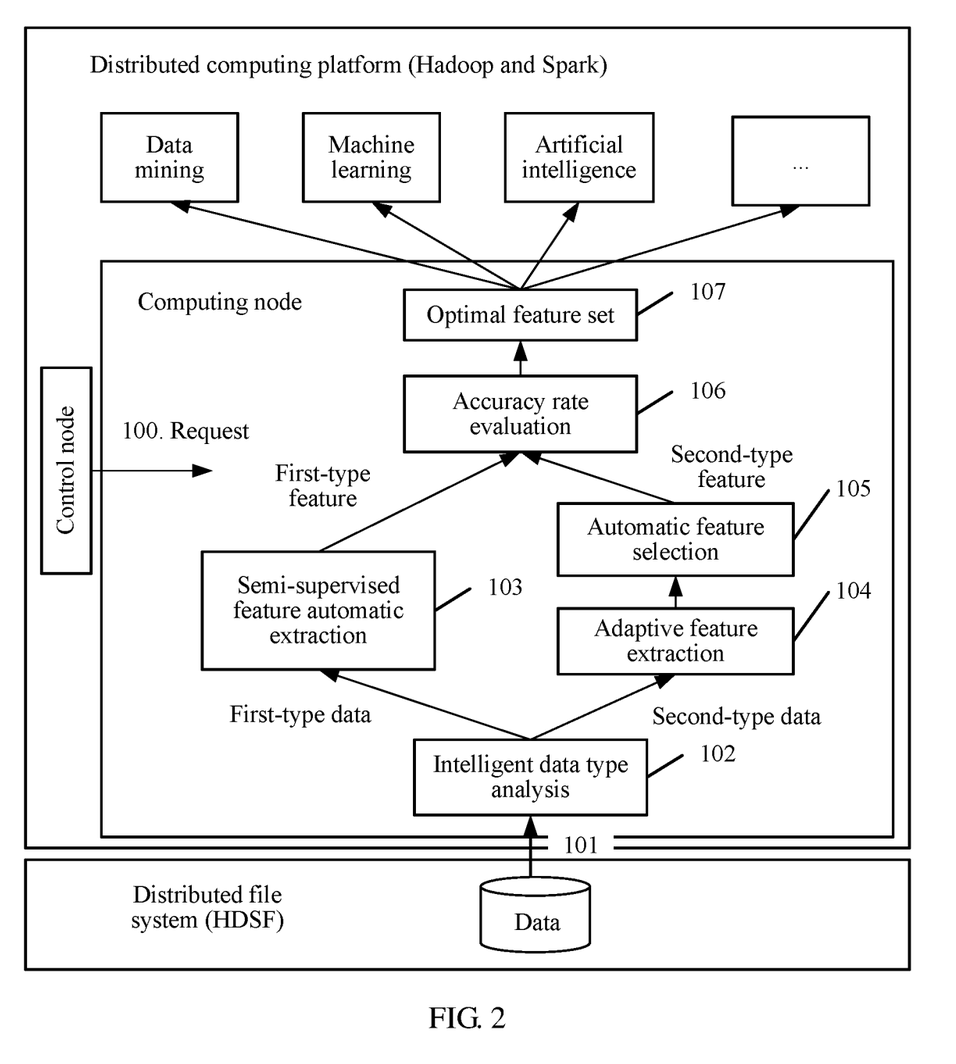
FIG. 2 is a schematic diagram of an embodiment of a feature set determining method according to an embodiment of the present disclosure.

A distributed system shown in FIG. 2 includes a distributed file system (e.g., Hadoop Distributed File System (HDSF)) and a distributed computing platform. The HDSF may correspond to the storage resource pool in FIG. 1, and the distributed computing platform may include the control node and the multiple computing nodes in FIG. 1.

In FIG. 2, a process in which all the computing nodes in the distributed computing platform determine feature sets is described by using, a process in which one computing node performs feature learning on data and determines a feature set, as an example.

As shown in FIG. 2, an embodiment of a feature set determining method provided in an embodiment of the present disclosure includes the following steps.

100. A computing node receives a feature set determining request sent by a control node.

The feature set determining request includes a learning objective of feature learning. The learning objective represents a direction of the feature learning of this time, that is, a requirement for the feature learning of this time, or a final result to be output. That is, the learning objective refers to a direction of screening massive data to obtain required data. For example, the learning objective may be learning, from commodity purchase data, whether a purchaser is a male or a female. That is, the learning objective is to determine a gender of the purchaser.

Only one learning objective is set for feature learning of each time.

Certainly, the request may be triggered by a task of the computing node, and is not limited to only being received from the control node.

101. The computing node obtains, from a distributed file system according to the received feature set determining request, data used for feature learning.

Data in the distributed storage system may be an image, a video, audio, a text, and numeric-type data.

102. The computing node performs type analysis on the obtained data, to divide the data into first-type data and second-type data, where the first-type data is non-numeric-type data, and the second-type data is numeric-type data.

The first-type data may be non-numeric-type data such as an image, a video, audio, a text, and a special character.

The second-type data is numeric-type data. The numeric-type data is accurate numerical values. Therefore, specific feature extraction may be performed on the numerical values.

103. The computing node performs semi-supervised learning on the first-type data, to extract multiple first-type features.

A learning objective determined from a single feature is unauthentic. Therefore, a feature set generally includes multiple features.

The semi-supervised learning means that supervised learning is performed on labeled data, and unsupervised learning is performed on unlabeled data.

104. The computing node performs adaptive learning on the second-type data.

When accuracy rates of features obtained from the adaptive learning meet the preset condition, the features obtained from the adaptive learning are used as second-type features, or when accuracy rates of features obtained from the adaptive learning do not meet the preset condition, step 105 is performed.

In this application, the accuracy rate refers to a degree of closeness between a feature obtained from learning and the learning objective. For example, when the learning objective is to determine whether a purchaser is a male or a female, a nationality-related feature is considered as a feature having a very low degree of closeness to the learning objective, and a cosmetics-related feature is considered as a feature having a very high degree of closeness to the learning objective. Therefore, whether an accuracy rate meets the requirement may be determined according to a degree of closeness between a feature and the learning objective.

In this application, a mean value is used to evaluate an accuracy rate of a feature. If a mean value of the accuracy rates does not meet a preset condition, for example, the mean value does not reach 60%, the accuracy rates of the features obtained from the adaptive learning do not meet the requirement.

105. The computing node performs automatic feature selection on features obtained from the adaptive learning, to determine multiple second-type features.

When the mean value of the accuracy rates of the features, determined in step 104, obtained from the adaptive learning does not reach the preset condition, a feature with a relatively low accuracy rate is eliminated by means of automatic feature selection, to retain a feature with an accuracy rate higher than the preset condition. For example, a nationality-related feature is eliminated.

106. The computing node evaluates the multiple first-type features and the multiple second-type features.

The first-type features and the second-type features are evaluated by using accuracy rates, and an evaluation method is basically the same as that in steps 104 and 105, all of which are screening out a feature with a low accuracy rate to retain a feature with an accuracy rate higher than the preset condition. Therefore, an optimal feature set in step 107 is obtained.

107. The computing node obtains an optimal feature set, and outputs the optimal feature set.

The optimal feature set may be a union set of an optimal feature set of the first-type features and an optimal feature set of the second-type features.

In comparison with the prior art in which much time is spent on learning a feature from data, in the feature set determining method provided in this embodiment of the present disclosure, different feature learning methods are used for different types of data, so that not only feature learning efficiency is improved, but also an accuracy rate of a feature set can be improved, thereby reducing a data mining threshold.

Figure 3:
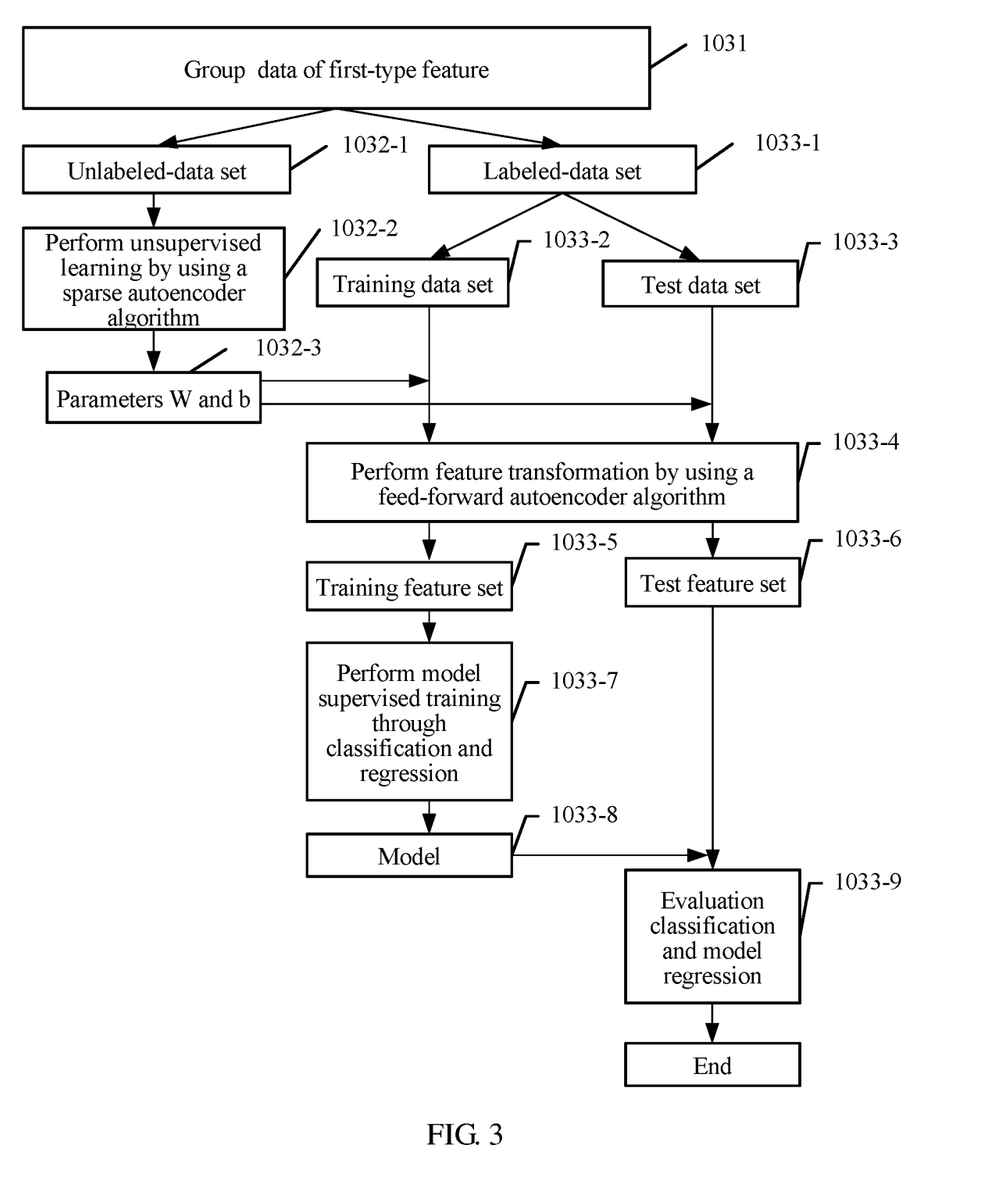
FIG. 3 is a schematic diagram of another embodiment of a feature set determining method according to an embodiment of the present disclosure.

Referring to FIG. 3, a process of step 103 of performing semi-supervised learning on the first-type data, to extract first-type features in FIG. 2 may include the following steps.

1031. Group the first-type data according to whether the data is labeled or unlabeled, to obtain an unlabeled-data set in step 1032-1 and a labeled-data set in step 1033-1.

It may be understood that, labeled data is data with a label, unlabeled data is data without a label, the unlabeled-data set is a set of data without a label, and the labeled-data set is a set of data with a label.

1032-1. Obtain the unlabeled-data set through grouping.

1032-2. Perform unsupervised learning on a unlabeled data by using a sparse autoencoder algorithm.

Dimensionality of data in a distributed file system is usually very high. Using commodity data as an example, when there are ten thousand types of commodities, the commodity data has ten thousand dimensions. A sparse function of the sparse autoencoder algorithm may reduce dimensionality of data to a very low level. For example, ten thousand dimensions of data may be reduced to ten dimensions or even lower. Simply, the sparse autoencoder algorithm may reduce a 10,000×10,000 matrix or a 1000×1000 matrix to a 10×10 matrix or another n×m matrix, and both n and m are positive integers less than 20. For a process of implementing data dimensionality reduction by using the sparse autoencoder algorithm, reference may be made to the prior art for understanding, and details are not described herein.

1032-3. After the unsupervised learning is performed on the unlabeled data by using the sparse autoencoder algorithm, obtain function parameters W and b in the sparse autoencoder algorithm.

For description of W and b, reference may be made to the foregoing description part of the technical terms for understanding.

1033-1. Obtain the labeled-data set through grouping, and further divide the labeled-data set into a training data set in step 1033-2 and a test data set in step 1033-3.

The labeled-data set is a set of data with a label. Optionally, to ensure an accuracy rate of an extracted feature, the labeled-data set is divided into the training data set and the test data set.

The training data set is used for feature training, and the test data set is used to test whether an accuracy rate of a feature obtained through training meets a requirement.

1033-2. Training data set.

1033-3. Test data set.

1033-4. Separately input W and b for the training data set and the test data set, and perform feature transformation according to a feed-forward autoencoder algorithm, to obtain a training feature set in step 1033-5 and a test feature set in step 1033-6.

The training feature set is a feature set for training a model, and the test feature set is a feature set for testing a model accuracy rate. Actually, each of the training feature set and the test feature set is a set of features, but usages of features in the sets are different.

1033-5. Training feature set.

1033-6. Test feature set.

1033-7. Perform model supervised training on the training feature set by using methods such as classification and regression.

1033-8. Obtain a model through training.

1033-9. Perform evaluation classification and model regression on the obtained model by using features in the test feature set, and finally determine the multiple first-type features.

Figure 4:
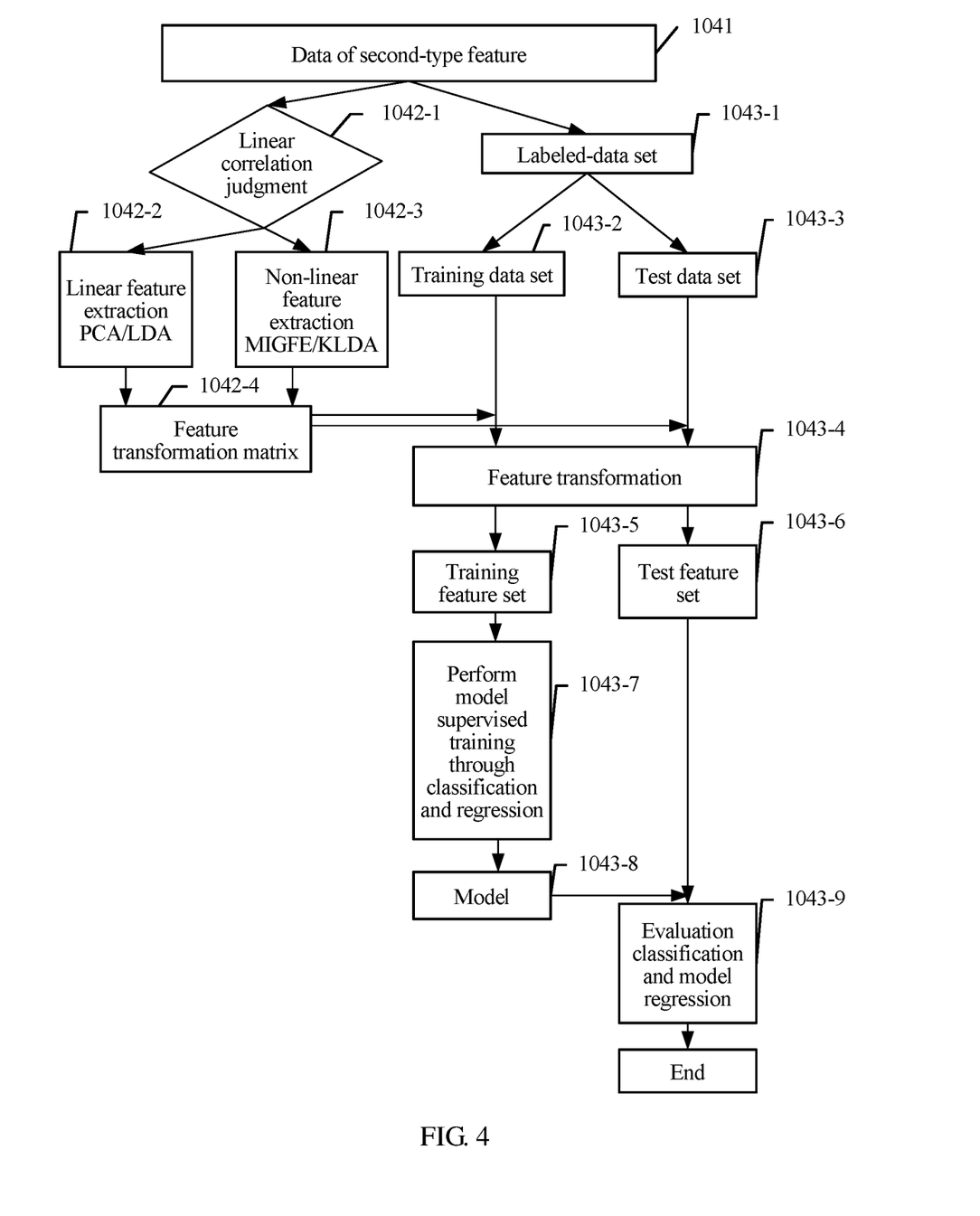
FIG. 4 is a schematic diagram of another embodiment of a feature set determining method according to an embodiment of the present disclosure.

Referring to FIG. 4, step 104 of performing adaptive learning on the second-type data, to extract features obtained from the adaptive learning in FIG. 2 may include the following steps.

1041. data of Second-type features.

1042-1. Perform linear correlation judgment on the data of second-type features.

1042-2. Linear feature extraction.

Linear feature extraction may be performed by using PCA method or an LDA method.

1042-3. Non-linear feature extraction.

Non-linear feature extraction may be performed by using an MIGFE method or a KLDA method.

1042-4. Feature transformation matrix.

The feature transformation matrix is obtained according to results of the linear feature extraction and the non-linear feature extraction.

1043-1. Labeled-data set in the second-type data.

The labeled-data set in the second-type data is divided into a training data set and a test data set. The training data set is used to train a feature parameter, and the test data set is used for feature testing.

1043-2. Training data set.

1043-3. Test data set.

1043-4. Feature transformation.

The feature transformation matrix in step 1042-4 is input to the training data set in step 1043-2 and the test data set in step 1043-3, and a training feature set in step 1043-5 and a test feature set in step 1043-6 may be separately obtained.

1043-5. Training feature set.

1043-6. Test feature set.

1043-7. Perform model supervised training on the training feature set by using methods such as classification and regression.

1043-8. Model obtained through training in step 1043-7.

1043-9. Perform evaluation classification and model regression on the obtained model by using features in the test feature set, and finally determine multiple features obtained from the adaptive learning.

When the accuracy rates of the features obtained from the adaptive learning meet the requirement, the features obtained from the adaptive learning are used as the second-type features, or when the accuracy rates of the features obtained from the adaptive learning do not meet the requirement, step 105 is performed, to determine multiple second-type features.

Figure 5:
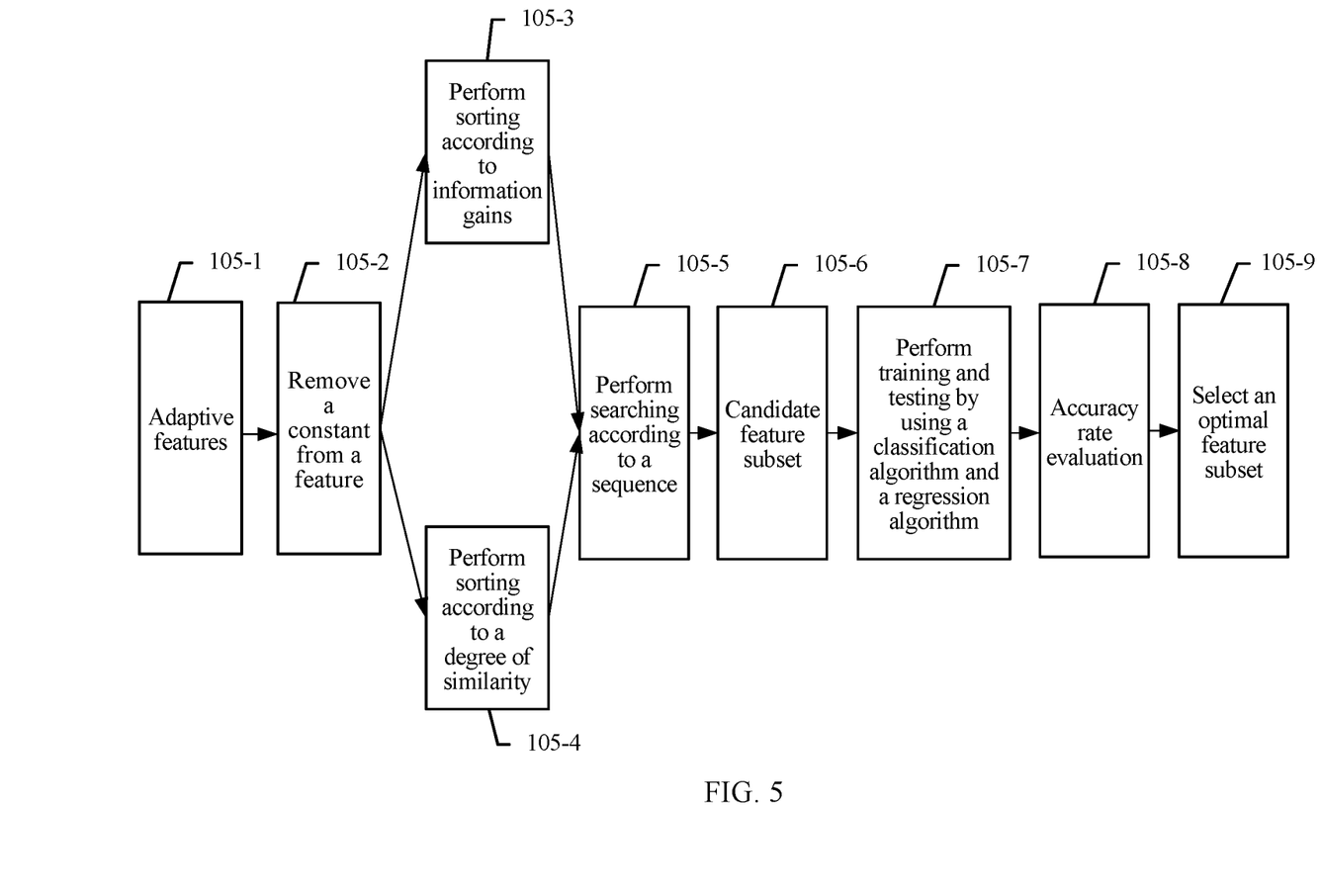
FIG. 5 is a schematic diagram of another embodiment of a feature set determining method according to an embodiment of the present disclosure.

Referring to FIG. 5, accuracy rate evaluation may be performed on the second-type features finally determined in step 104 or step 105, to obtain an optimal feature set.

105-1. Features obtained from the adaptive learning.

105-2. Remove constants from the features obtained from the adaptive learning, to obtain multiple primary features.

There are many features obtained from the adaptive learning, and some features may be constants. In this application, if a feature is a constant, it means that the feature basically has no effect on a learning objective. For example, when the learning objective is to determine whether a purchaser is a male or a female, a nationality of the purchaser may be considered as a constant.

105-3. Perform sorting according to information gains.

A feature may have a gain over time. For example, if a purchaser may purchase cosmetics again or many times, a feature of the cosmetics may have a gain. Therefore, when features in the optimal feature set are being determined, information gains of the features should be taken into consideration. A feature with a relatively high gain is considered preferentially. Actually, sorting may be performed according to a gain rate, and the gain rate is a rate of a gain.

105-4. Perform sorting according to a degree of similarity between the primary features.

The degree of similarity usually refers to a similarity between two features. For example, a similarity between a facial mask and a moisturizer is very high, and therefore, a degree of similarity is very high, and functions of the both are consistent for the learning objective of determining whether the purchaser is a male or a female. Therefore, to reduce dimensionality of data, one of the facial mask or the moisturizer may be deleted.

105-5. Perform searching according to a sequence.

A backward search algorithm is used based on a sorting result, to successively reduce a quantity of features.

105-6. Candidate feature subset.

105-7. Perform training and testing by using a classification algorithm and a regression algorithm.

105-8. Accuracy rate evaluation.

105-9. Select an optimal feature subset.

According to such an automatic feature selection method, an optimal feature subset is searched for based on a sequence of importance of sorted features, thereby substantially reducing feature search space, and improving running efficiency. Further, a reinforcement learning algorithm is used, to prevent a feature with a relatively small contribution degree from not being selected, thereby improving an accuracy rate of a feature subset.

Figure 6:
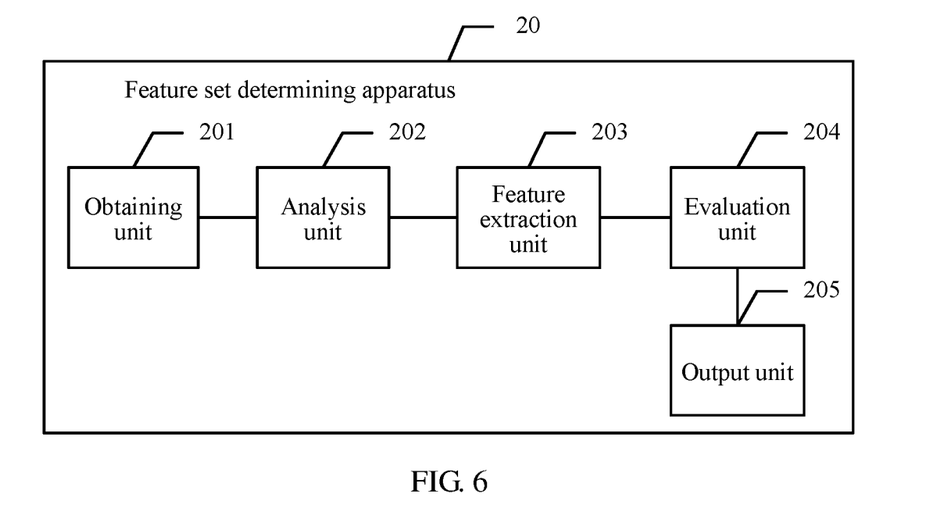
FIG. 6 is a schematic diagram of an embodiment of a feature set determining apparatus according to an embodiment of the present disclosure.

Referring to FIG. 6, an embodiment of a feature set determining apparatus provided in an embodiment of the present disclosure includes:

an obtaining unit 201, configured to obtain, according to a received feature set determining request, data used for feature learning, where the feature set determining request includes a learning objective of the feature learning;

an analysis unit 202, configured to perform type analysis on the data obtained by the obtaining unit 201, to divide the data into first-type data and second-type data, where the first-type data is non-numeric-type data, and the second-type data is numeric-type data;

a feature extraction unit 203, configured to perform semi-supervised learning on the first-type data analyzed by the analysis unit 202, to extract multiple first-type features, and perform adaptive learning on the second-type data analyzed by the analysis unit 202, to extract multiple second-type features;

an evaluation unit 204, configured to evaluate the multiple first-type features and the multiple second-type features that are extracted by the feature extraction unit 203, to obtain an optimal feature set, where the optimal feature set includes multiple features with accuracy rates meeting a preset condition, and the accuracy rate is a degree of closeness between each feature and the learning objective; and an output unit 205, configured to output the optimal feature set obtained through evaluation by the evaluation unit 204, to respond to the feature set determining request.

In comparison with the prior art in which much time is spent on learning a feature from data, in the feature set determining apparatus provided in this embodiment of the present disclosure, different feature processing methods are used for different types of data, so that not only feature learning efficiency is improved, but also an accuracy rate of a feature set can be improved, thereby reducing a data mining threshold.

Optionally, the feature extraction unit 203 is specifically configured to:

perform unsupervised learning on a unlabeled data by using a sparse autoencoder algorithm, to obtain function parameters W and b in the sparse autoencoder algorithm, where W is a variable coefficient in the sparse autoencoder algorithm, and b is a constant in the sparse autoencoder algorithm; and perform feature transformation on a labeled data and W and b by using a feed-forward autoencoder algorithm, to obtain the first-type features.

Optionally, the feature extraction unit 203 is specifically configured to:

perform linear correlation judgment on the second-type data;

perform feature extraction according to a result of the linear correlation judgment by using a feature extraction strategy corresponding to the result, to obtain a feature transformation matrix; and perform feature transformation on labeled data in the second-type data according to the feature transformation matrix, to obtain the second-type features.

Optionally, the feature extraction unit 203 is specifically configured to:

perform feature transformation on a labeled data in the second-type data according to the feature transformation matrix, to obtain features obtained from the adaptive learning; and when accuracy rates of the features obtained from the adaptive learning meet the preset condition, use the features obtained from the adaptive learning as the second-type features, or when accuracy rates of the features obtained from the adaptive learning do not meet the preset condition, perform automatic feature selection on the features obtained from the adaptive learning, to determine the second-type features.

Optionally, the feature extraction unit 203 is specifically configured to:

when the result is linear correlation, if a proportion of a data volume of the labeled-data set in a second-type data exceeds a preset threshold, perform supervised linear feature extraction by using an LDA algorithm, to obtain the feature transformation matrix, or if a proportion is lower than a preset threshold, perform non-supervised linear feature extraction by using a PCA algorithm, to obtain the feature transformation matrix; or when the result is non-linear correlation, if a proportion exceeds a preset threshold, perform supervised linear feature extraction by using a KLDA algorithm, to obtain the feature transformation matrix, or if a proportion is lower than a preset threshold, perform non-supervised non-linear feature extraction by using an MIGFE algorithm, to obtain the feature transformation matrix.

Optionally, the feature extraction unit 203 is specifically configured to:

remove constants from the features obtained from the adaptive learning, to obtain multiple primary features; and sort and screen the primary features according to information gains of the primary features and a degree of similarity between the primary features, and use the sorted primary features as the second-type features.

Figure 7:
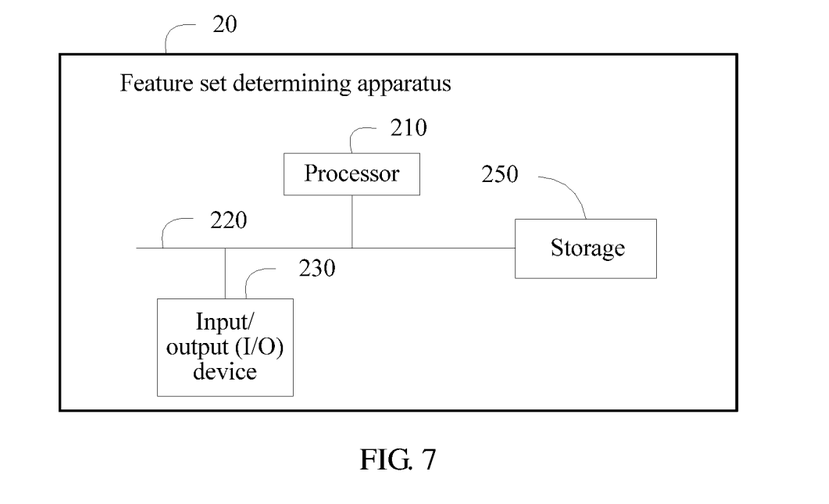
FIG. 7 is a schematic diagram of another embodiment of a feature set determining apparatus according to an embodiment of the present disclosure.

The feature set determining apparatus described above may be the computing node on the network shown in FIG. 1 and FIG. 2. FIG. 7 is a schematic structural diagram of a feature set determining apparatus 20 according to an embodiment of the present disclosure. The feature set determining apparatus 20 includes a processor 210, a storage 250, and an input/output I/O device 230. The storage 250 may include a read-only memory and a random access memory, and provides an operation instruction and data for the processor 210. A part of the storage 250 may further include a non-volatile random access memory (NVRAM).

In some implementation manners, the storage 250 stores the following elements: an executable module or a data structure, or a subset thereof, or an extension set thereof.

In this embodiment of the present disclosure, the operation instruction (where the operation instruction may be stored in an operating system) stored in the storage 250 are invoked, to execute the following operations:

obtaining, according to a received feature set determining request, data used for feature learning, where the feature set determining request includes a learning objective of the feature learning;

performing type analysis on the data, to divide the data into first-type data and second-type data, where the first-type data is non-numeric-type data, and the second-type data is numeric-type data;

performing semi-supervised learning on the first-type data, to extract multiple first-type features, and performing adaptive learning on the second-type data, to extract multiple second-type features;

evaluating the multiple first-type features and the multiple second-type features, to obtain an optimal feature set, where the optimal feature set includes multiple features with accuracy rates meeting a preset condition, and the accuracy rate is a degree of closeness between each feature and the learning objective; and outputting the optimal feature set, to respond to the feature set determining request.

In comparison with the prior art in which much time is spent on learning a feature from data, in the feature set determining apparatus provided in this embodiment of the present disclosure, different feature processing methods are used for different types of data, so that not only feature learning efficiency is improved, but also an accuracy rate of a feature set can be improved, thereby reducing a data mining threshold.

The processor 210 controls operations of the feature set determining apparatus 20. The processor 210 may be referred to as a central processing unit (CPU). The storage 250 may include a read-only memory and a random access memory, and provides an instruction and data for the processor 210. A part of the storage 250 may further include a NVRAM. In application of the present disclosure, components of the feature set determining apparatus 20 are coupled together by using a bus system 220. In addition to a data bus, the bus system 220 includes a power bus, a control bus, a status signal bus, and the like. However, for clarity of description, various types of buses are marked as the bus system 220 in the figure.

The methods disclosed in the foregoing embodiments of the present disclosure may be applied to the processor 210, or may be implemented by the processor 210. The processor 210 may be an integrated circuit chip and has a signal processing capability. In an implementation process, steps of the foregoing methods may be implemented by using an integrated logic circuit of hardware in the processor 210 or an instruction in a software form. The foregoing processor 210 may be a general processor, a digital signal processor (DSP), an application-specific integrated circuit (ASIC), a field programmable gate array (FPGA) or another programmable logic device, a discrete gate or a transistor logic device, or a discrete hardware component, and may implement or execute the methods, steps, and logical block diagrams disclosed in the embodiments of the present disclosure. The general purpose processor may be a microprocessor, or the processor may be any conventional processor or the like. The steps of the methods disclosed in the embodiments of the present disclosure may be directly executed by a hardware decoding processor, or may be executed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the storage 250, and the processor 210 reads information in the storage 250 and implements the steps of the foregoing methods in combination with the hardware of the processor 210.

Optionally, the processor 210 is specifically configured to:

perform unsupervised learning on a unlabeled data by using a sparse autoencoder algorithm, to obtain function parameters W and b in the sparse autoencoder algorithm, where W is a variable coefficient in the sparse autoencoder algorithm, and b is a constant in the sparse autoencoder algorithm; and perform feature transformation on a labeled data and W and b by using a feed-forward autoencoder algorithm, to obtain the multiple first-type features.

Optionally, the processor 210 is specifically configured to:

perform linear correlation judgment on the second-type data;

perform feature extraction according to a result of the linear correlation judgment by using a feature extraction strategy corresponding to the result, to obtain a feature transformation matrix; and perform feature transformation on labeled data in the second-type data according to the feature transformation matrix, to obtain the multiple second-type features.

Optionally, the processor 210 is specifically configured to:

perform feature transformation on a labeled data in the second-type data according to the feature transformation matrix, to obtain features obtained from the adaptive learning; and when accuracy rates of the features obtained from the adaptive learning meet the preset condition, use the features obtained from the adaptive learning as the second-type features, or when accuracy rates of the features obtained from the adaptive learning do not meet the preset condition, perform automatic feature selection on the features obtained from the adaptive learning, to determine the second-type features.

Optionally, the processor 210 is specifically configured to:

when the result is linear correlation, if a proportion of a data volume of the labeled-data set in a second-type data exceeds a preset threshold, perform supervised linear feature extraction by using an LDA algorithm, to obtain the feature transformation matrix, or if a proportion is lower than a preset threshold, perform non-supervised linear feature extraction by using PCA algorithm, to obtain the feature transformation matrix; or when the result is non-linear correlation, if a proportion exceeds a preset threshold, perform supervised linear feature extraction by using a KLDA algorithm, to obtain the feature transformation matrix, or if a proportion is lower than a preset threshold, perform non-supervised non-linear feature extraction by using an MIGFE algorithm, to obtain the feature transformation matrix.

Optionally, the processor 210 is specifically configured to:

remove constants from the features obtained from the adaptive learning, to obtain multiple primary features; and sort and screen the primary features according to information gains of the primary features and a degree of similarity between the primary features, and use the sorted primary features as the second-type features.

In addition, the feature set determining method provided in the embodiment of the present disclosure may be executed by a physical host on which one or more virtual machines (VM) are located. For example, the feature set determining method may be executed by a host on the physical host, and the host is a combination of a virtual machine monitor (VMM) and a privileged virtual machine running on the VMM. This implementation manner is generally used in a cloud computing scenario.

For example, the obtaining unit 201, the analysis unit 202, the feature extraction unit 203, the evaluation unit 204, and the output unit 205 may be disposed on one or more virtual machines. For example, the feature extraction unit 203 may be implemented by using one virtual machine, and each of the other units may also be implemented by using one virtual machine, or some units are implemented by using one virtual machine. This is not limited in this embodiment of the present disclosure.

Figure 8:
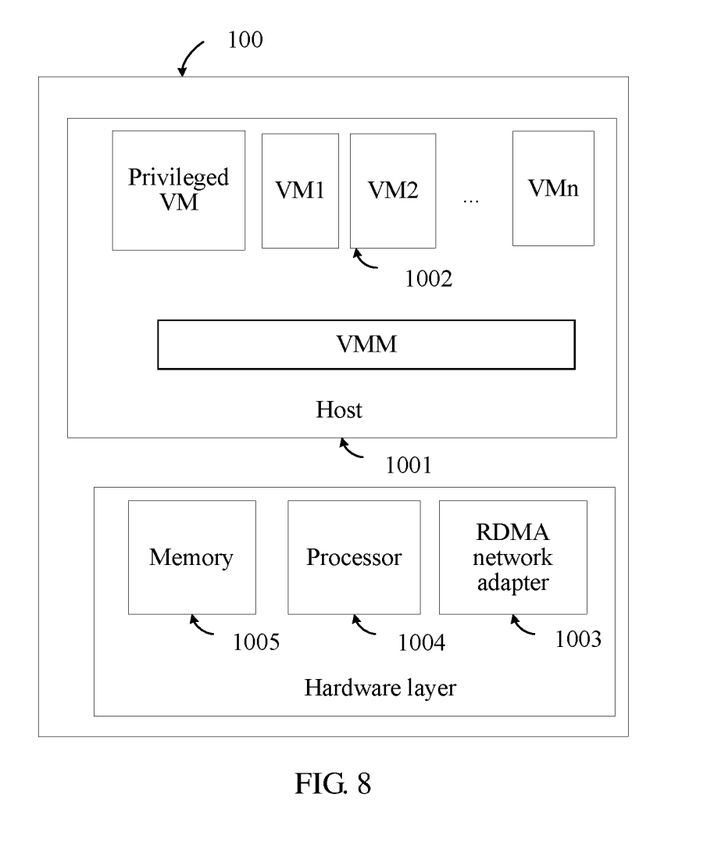
FIG. 8 is a schematic diagram of a physical host for determining a feature set according to an embodiment of the present disclosure.

For example, as shown in FIG. 8, the obtaining unit 201, the analysis unit 202, the feature extraction unit 203, the evaluation unit 204, and the output unit 205 may be disposed on a physical host 100 on which one virtual machine is located, and the physical host 100 executes the feature set determining method in the foregoing embodiment.

The physical host 100 includes a hardware layer, a host 1001 running on the hardware layer, and at least one VM 1002 running on the host 1001. The hardware layer includes a network adapter 1003, and optionally, may further include a processor 1004 and a memory 1005. The host may include a VMM on the physical host 100 and a privileged virtual machine running on the VMM. The VM 1002 is a virtual machine on the physical host 100 other than the privileged virtual machine.

Specifically, the VM 1002 may be one or more virtual computers emulated on one physical host by using virtual machine software, and these virtual machines work as real computers. An operating system and an application program may be installed on a virtual machine, and the virtual machines may further access network resources. For an application program running on a virtual machine, the virtual machine works as if the virtual machine is on a real computer.

The hardware layer is a hardware platform on which a virtualized environment runs. The hardware layer may include many types of hardware. For example, a hardware layer of a physical host may include the processor 1004 (such as a CPU) and the memory 1005, and may further include a high-speed/low-speed input/output (I/O) device such as the network adapter 1003 (for example, a remote direct memory access (RDMA) network adapter) or a storage, and another device having a specified processing function.

The host 1001 serves as a management layer, and is configured to implement management and allocation of hardware resources, present a virtual hardware platform to a virtual machine, and implement scheduling and isolation of the virtual machine. The host may be a VMM. In addition, the VMM sometimes cooperates with one privileged virtual machine, and the two form the host in combination. The virtual hardware platform provides various hardware resources for each virtual machine running on the virtual hardware platform. For example, the virtual hardware platform provides a virtual processor (such as a VCPU), a virtual memory, a virtual disk, and a virtual network adapter. The virtual disk may be corresponding to a file or a logic block device of the host. A virtual machine runs on a virtual hardware platform that is prepared by the host for the virtual machine, and one or more virtual machines run on the host.

The privileged virtual machine is a special virtual machine, and may be referred to as a drive domain. For example, this special virtual machine is referred to as Dom0 on a Xen Hypervisor platform. Drive programs of real physical devices such as a network adapter and a SCSI disk are installed on the virtual machine, and these real physical devices can be detected and directly accessed. Another virtual machine accesses a real physical device by using a corresponding mechanism provided by the Hypervisor and by using the privileged virtual machine.

It should be understood that this embodiment of the present disclosure may be applied to a Xen virtual machine platform, or may be applied to any virtualization platform that requires mapping of a memory of a virtual machine when the virtual machine is migrated. This is not limited in this embodiment of the present disclosure.

Specifically, for the feature set determining method, reference may be made to some related description in FIG. 1 to FIG. 5 for understanding, and details are not repeatedly described herein.

A person of ordinary skill in the art may understand that all or a part of the steps of the methods in the embodiments may be implemented by a program instructing relevant hardware. The program may be stored in a computer readable storage medium. The storage medium may include a read only memory (ROM), a random access memory (RAM), a magnetic disk, an optical disc, and the like.

The foregoing describes in detail the feature set determining method and apparatus provided in the embodiments of the present disclosure. In this specification, specific examples are used to describe the principle and implementation manners of the present disclosure, and the description of the embodiments is only intended to help understand the method and core idea of the present disclosure. In addition, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A feature set determining method, comprising:
    obtaining, according to a received feature set determining request, data for feature learning, wherein the feature set determining request comprises a learning objective of the feature learning;
    performing type analysis on the data to divide the data into first-type data and second-type data, wherein the first-type data is non-numeric-type data, and wherein the second-type data is numeric-type data;
    performing semi-supervised learning on the first-type data to extract multiple first-type features;
    performing adaptive learning on the second-type data to extract multiple second-type features;
    determining, for each feature of the multiple first-type features and the multiple second-type features, respective accuracy rates by determining a degree of closeness between the feature and the learning objective;
    determining, for each accuracy rate of the respective accuracy rates, whether the accuracy rate meets a preset condition;
    evaluating the multiple first-type features and the multiple second-type features to obtain an optimal feature set by selecting optimal features of the multiple first-type features and the multiple second-type features that have first accuracy rates of the respective accuracy rates that meet the preset condition; and
    outputting the optimal feature set to respond to the feature set determining request.

2. The method of claim 1, wherein the first-type data comprises labeled data and unlabeled data, and wherein performing the semi-supervised learning on the first-type data to extract multiple first-type features comprises:

performing unsupervised learning on the unlabeled data using a sparse autoencoder algorithm to obtain function parameters W and b in the sparse autoencoder algorithm, wherein W is a variable coefficient in the sparse autoencoder algorithm, and wherein b is a constant in the sparse autoencoder algorithm; and performing feature transformation on the labeled data and W and b using a feed-forward autoencoder algorithm to obtain the multiple first-type features.

3. The method of claim 1, wherein performing the adaptive learning on the second-type data to extract multiple second-type features comprises:

performing linear correlation judgment on the second-type data;

performing feature extraction according to a result of the linear correlation judgment by using a feature extraction strategy corresponding to the result to obtain a feature transformation matrix; and performing feature transformation on labeled data in the second-type data according to the feature transformation matrix to obtain the multiple second-type features.

4. The method according toof claim 3, wherein performing the feature transformation on the labeled data in the second-type data according to the feature transformation matrix to obtain the multiple second-type features comprises:

performing feature transformation on the labeled data in the second-type data according to the feature transformation matrix to obtain features obtained from the adaptive learning; and using, when accuracy rates of the features obtained from the adaptive learning meet the preset condition, the features obtained from the adaptive learning as the second-type features.

5. The method of claim 3, wherein performing the feature transformation on the labeled data in the second-type data according to the feature transformation matrix to obtain the multiple second-type features comprises:

performing feature transformation on the labeled data in the second-type data according to the feature transformation matrix to obtain features obtained from the adaptive learning; and performing, when accuracy rates of the features obtained from the adaptive learning do not meet the preset condition, automatic feature selection on the features obtained from the adaptive learning, to determine the second-type features.

6. The method of claim 3, wherein performing the feature extraction according to the result of the linear correlation judgment using the feature extraction strategy corresponding to the result to obtain the feature transformation matrix comprises:

when the result is linear correlation and a proportion of a data volume of the labeled-data set in a second-type data exceeds a preset threshold, performing supervised linear feature extraction by using a linear discriminant analysis (LDA) algorithm, to obtain the feature transformation matrix;

when the result is linear correlation and the proportion is lower than the preset threshold, performing non-supervised linear feature extraction by using a principal component analysis (PCA) algorithm, to obtain the feature transformation matrix;

when the result is non-linear correlation and the proportion exceeds the preset threshold, performing supervised linear feature extraction using a kernel linear discriminant analysis (KLDA) algorithm to obtain the feature transformation matrix; and when the result is non-linear correlation and the proportion is lower than the preset threshold, performing non-supervised non-linear feature extraction to obtain the feature transformation matrix.

7. The method of claim 4, wherein performing, when the accuracy rates of the features obtained from the adaptive learning do not meet the preset condition, automatic feature selection on the features obtained from the adaptive learning to determine the second-type features comprises:

removing constants from the features obtained from the adaptive learning to obtain multiple primary features; and sorting and screening the multiple primary features according to information gains of the multiple primary features and a degree of similarity between the multiple primary features to obtain the second-type features.

8. A feature set determining apparatus, comprising:

a transceiver;

a storage configured to store a computer executable instruction; and a processor coupled to the storage and the transceiver and configured to execute the computer executable instruction to cause the feature set determining apparatus to:

obtain, according to a received feature set determining request, data for feature learning, wherein the feature set determining request comprises a learning objective of the feature learning;

perform type analysis on the data to divide the data into first-type data and second-type data, wherein the first-type data is non-numeric-type data, and wherein the second-type data is numeric-type data;

perform semi-supervised learning on the first-type data to extract multiple first-type features;

perform adaptive learning on the second-type data to extract multiple second-type features;

determine, for each feature of the multiple first-type features and the multiple second-type features, respective accuracy rates by determining a degree of closeness between the feature and the learning objective;

determine, for each accuracy rate of the respective accuracy rates, whether the accuracy rate meets a preset condition;

evaluate the multiple first-type features and the multiple second-type features to obtain an optimal feature set by selecting optimal features of the multiple first-type features and the multiple second-type features that have first accuracy rates of the respective accuracy rates that meet the preset condition; and output the optimal feature set to respond to the feature set determining request.

9. The feature set determining apparatus of claim 8, wherein the first-type data comprises labeled data and unlabeled data, and wherein when executed by the processor, the computer executable instructions cause the feature set determining apparatus to perform the semi-supervised learning on the first-type data to extract the multiple first-type features by:

performing unsupervised learning on the unlabeled data using a sparse autoencoder algorithm, to obtain function parameters W and b in the sparse autoencoder algorithm, wherein W is a variable coefficient in the sparse autoencoder algorithm, and wherein b is a constant in the sparse autoencoder algorithm; and performing feature transformation on the labeled data and W and b using a feed-forward autoencoder algorithm to obtain the multiple first-type features.

10. The feature set determining apparatus of claim 8, wherein when executed by the processor, the computer executable instructions cause the feature set determining apparatus to perform the adaptive learning on the second-type data to extract the multiple second-type features by:
performing linear correlation judgment on the second-type data;
performing feature extraction according to a result of the linear correlation judgment using a feature extraction strategy corresponding to the result to obtain a feature transformation matrix; and
performing feature transformation on labeled data in the second-type data according to the feature transformation matrix to obtain the multiple second-type features.

11. The feature set determining apparatus of claim 10, wherein when executed by the processor, the computer executable instructions cause the feature set determining apparatus to perform the feature transformation on the labeled data in the second-type data according to the feature transformation matrix to obtain the multiple second-type features by:
performing feature transformation on the labeled data in the second-type data according to the feature transformation matrix to obtain features obtained from the adaptive learning; and
using, when accuracy rates of the features obtained from the adaptive learning meet the preset condition, the features obtained from the adaptive learning as the second-type features.

12. The feature set determining apparatus of claim 10, wherein when executed by the processor, the computer executable instructions cause the feature set determining apparatus to perform the feature transformation on the labeled data in the second-type data according to the feature transformation matrix to obtain the multiple second-type features by:
performing feature transformation on the labeled data in the second-type data according to the feature transformation matrix to obtain features obtained from the adaptive learning; and
performing, when accuracy rates of the features obtained from the adaptive learning do not meet the preset condition, automatic feature selection on the features obtained from the adaptive learning to determine the second-type features.

13. The feature set determining apparatus of claim 10, wherein when executed by the processor, the computer executable instructions cause the feature set determining apparatus to perform the feature extraction by:
when the result is linear correlation and a proportion of a data volume of the labeled-data set in a second-type data exceeds a preset threshold, performing supervised linear feature extraction using a linear discriminant analysis (LDA) algorithm to obtain the feature transformation matrix;
when the result is linear correlation and a proportion is lower than the preset threshold, performing non-supervised linear feature extraction using a principal component analysis (PCA) algorithm to obtain the feature transformation matrix;
when the result is non-linear correlation and a proportion exceeds the preset threshold, performing supervised linear feature extraction using a kernel linear discriminant analysis (KLDA) algorithm to obtain the feature transformation matrix; and
when the result is non-linear correlation and a proportion is lower than the preset threshold, performing non-supervised non-linear feature extraction to obtain the feature transformation matrix.

14. The feature set determining apparatus of claim 12, wherein when executed by the processor, the computer executable instructions cause the feature set determining apparatus to perform, when the accuracy rates of the features obtained from the adaptive learning do not meet the preset condition, the automatic feature selection on the features obtained from the adaptive learning to determine the second-type features by:
removing constants from the features obtained from the adaptive learning to obtain multiple primary features; and
sorting and screening the multiple primary features according to information gains of the multiple primary features and a degree of similarity between the multiple primary features to obtain the second-type features.

15. A computer-readable storage medium comprising instructions which, when executed by a computer, cause the computer to:
obtain, according to a received feature set determining request, data for feature learning, wherein the feature set determining request comprises a learning objective of the feature learning;
perform type analysis on the data to divide the data into first-type data and second-type data, wherein the first-type data is non-numeric-type data, and wherein the second-type data is numeric-type data;
perform semi-supervised learning on the first-type data to extract multiple first-type features;
perform adaptive learning on the second-type data to extract multiple second-type features;
determine, for each feature of the multiple first-type features and the multiple second-type features, respective accuracy rates by determining a degree of closeness between the feature and the learning objective;
determine, for each accuracy rate of the respective accuracy rates, whether the accuracy rate meets a preset condition;
evaluate the multiple first-type features and the multiple second-type features to obtain an optimal feature set, by selecting optimal features of the multiple first-type features and the multiple second-type features that have first accuracy rates of the respective accuracy rates that meet the preset condition; and
output the optimal feature set to respond to the feature set determining request.

16. The computer-readable storage medium of claim 15, wherein the first-type data comprises labeled data and unlabeled data, and wherein when executed by the computer, the instructions cause the computer to perform the semi-supervised learning on the first-type data to extract the multiple first-type features by:
performing unsupervised learning on the unlabeled data using a sparse autoencoder algorithm to obtain function parameters W and b in the sparse autoencoder algorithm, wherein W is a variable coefficient in the sparse autoencoder algorithm, and wherein b is a constant in the sparse autoencoder algorithm; and
performing feature transformation on the labeled data and W and b using a feed-forward autoencoder algorithm to obtain the multiple first-type features.

17. The computer-readable storage medium of claim 15, wherein when executed by the computer, the instructions cause the computer to perform adaptive learning on the second-type data to extract the multiple second-type features by:
  performing linear correlation judgment on the second-type data;
  performing feature extraction according to a result of the linear correlation judgment using a feature extraction strategy corresponding to the result to obtain a feature transformation matrix; and
  performing feature transformation on labeled data in the second-type data according to the feature transformation matrix to obtain the multiple second-type features.

18. The computer-readable storage medium of claim 17, wherein when executed by the computer, the instructions cause the computer to perform the feature transformation on the labeled data in the second-type data according to the feature transformation matrix to obtain the multiple second-type features by:
  performing feature transformation on the labeled data in the second-type data according to the feature transformation matrix to obtain features obtained from the adaptive learning;
  using, when accuracy rates of the features obtained from the adaptive learning meet the preset condition, the features obtained from the adaptive learning as the second-type features; and
  performing, when accuracy rates of the features obtained from the adaptive learning do not meet the preset condition, automatic feature selection on the features obtained from the adaptive learning to determine the second-type features.

19. The computer-readable storage medium of claim 17, wherein when executed by the computer, the instructions cause the computer to perform the feature extraction according to the result of the linear correlation judgment using the feature extraction strategy corresponding to the result to obtain the feature transformation matrix by:
  when the result is linear correlation and a proportion of a data volume of the labeled-data set in a second-type data exceeds a preset threshold, performing supervised linear feature extraction by using a linear discriminant analysis (LDA) algorithm to obtain the feature transformation matrix;
  when the result is linear correlation and the proportion is lower than the preset threshold, performing non-supervised linear feature extraction using a principal component analysis (PCA) algorithm to obtain the feature transformation matrix;
  when the result is non-linear correlation and the proportion exceeds the preset threshold, performing supervised linear feature extraction using a kernel linear discriminant analysis (KLDA) algorithm to obtain the feature transformation matrix; and
  when the result is non-linear correlation and the proportion is lower than the preset threshold, performing non-supervised non-linear feature extraction to obtain the feature transformation matrix.

20. The computer-readable storage medium of claim 18, wherein when executed by the computer, the instructions cause the computer to perform, when the accuracy rates of the features obtained from the adaptive learning do not meet the preset condition, the automatic feature selection on the features obtained from the adaptive learning to determine the second-type features by:
  removing constants from the features obtained from the adaptive learning to obtain multiple primary features; and
  sorting and screening the multiple primary features according to information gains of the multiple primary features and a degree of similarity between the multiple primary features to obtain the second-type features.

* * * * *

UNITED STATES PATENT AND TRADEMARK OFFICE
CERTIFICATE OF CORRECTION

PATENT NO. : 11,461,659 B2  
APPLICATION NO. : 15/871460  
DATED : October 4, 2022  
INVENTOR(S) : Dandan Tu and Jiajin Zhang Page 1 of 1

It is certified that error appears in the above-identified patent and that said Letters Patent is hereby corrected as shown below:

In the Claims

Claim 15, Column 20, Line 46 "feature set," should read "feature set"

Signed and Sealed this
Twenty-fourth Day of January, 2023

Katherine Kelly Vidal
*Director of the United States Patent and Trademark Office*